United States Patent
De Mes et al.

(10) Patent No.: US 8,566,192 B2
(45) Date of Patent: Oct. 22, 2013

(54) METHOD OR APPARATUS FOR SHARING IMAGE DATA

(75) Inventors: Arjan De Mes, Leiden (NL); Tijs Wilbrink, Leiden (NL)

(73) Assignee: International Business Machines Corporation, Armonk, NY (US)

( * ) Notice: Subject to any disclaimer, the term of this patent is extended or adjusted under 35 U.S.C. 154(b) by 1177 days.

(21) Appl. No.: 11/439,029

(22) Filed: May 23, 2006

(65) Prior Publication Data

US 2006/0271593 A1 Nov. 30, 2006

(30) Foreign Application Priority Data

May 26, 2005 (GB) ................................. 0510713.1

(51) Int. Cl.
*G06Q 30/00* (2012.01)
(52) U.S. Cl.
USPC ........................................................ 705/35
(58) Field of Classification Search
USPC ...................... 707/104.1, 100; 705/77, 27, 35
See application file for complete search history.

(56) References Cited

U.S. PATENT DOCUMENTS

| | | | | |
|---|---|---|---|---|
| 6,311,167 B1 * | 10/2001 | Davis et al. | ...................... | 705/35 |
| 6,965,868 B1 * | 11/2005 | Bednarek | ...................... | 705/7.14 |
| 7,071,842 B1 * | 7/2006 | Brady, Jr. | ...................... | 340/988 |
| 7,146,188 B2 * | 12/2006 | Deeds | ...................... | 455/556.1 |
| 7,231,372 B1 * | 6/2007 | Prange et al. | ...................... | 705/67 |
| 7,246,084 B1 * | 7/2007 | Javangula et al. | ...................... | 705/26.35 |
| 7,249,182 B1 * | 7/2007 | Heinonen et al. | ...................... | 709/227 |
| 7,263,086 B2 * | 8/2007 | Viikari et al. | ...................... | 370/338 |
| 7,272,404 B2 * | 9/2007 | Overy et al. | ...................... | 455/456.1 |
| 7,278,084 B2 * | 10/2007 | Palin et al. | ...................... | 714/758 |
| 7,280,822 B2 * | 10/2007 | Fraccaroli | ...................... | 455/414.3 |
| 7,305,396 B2 * | 12/2007 | Schmidt et al. | ...................... | 1/1 |
| 7,330,441 B2 * | 2/2008 | Nakagawa | ...................... | 370/255 |
| 2002/0041328 A1 * | 4/2002 | LeCompte et al. | ...................... | 348/144 |
| 2003/0069893 A1 * | 4/2003 | Kanai et al. | ...................... | 707/104.1 |
| 2003/0233278 A1 * | 12/2003 | Marshall | ...................... | 705/14 |
| 2004/0054609 A1 * | 3/2004 | Takahashi | ...................... | 705/35 |
| 2004/0070678 A1 * | 4/2004 | Toyama et al. | ...................... | 348/231.3 |
| 2004/0152485 A1 * | 8/2004 | Deeds | ...................... | 455/556.1 |
| 2004/0202443 A1 * | 10/2004 | Obrador et al. | ...................... | 386/4 |
| 2005/0114232 A1 * | 5/2005 | McIntyre et al. | ...................... | 705/27 |
| 2005/0246324 A1 * | 11/2005 | Paalasmaa et al. | ...................... | 707/3 |
| 2005/0255804 A1 * | 11/2005 | Steelberg et al. | ...................... | 455/3.06 |
| 2005/0255826 A1 * | 11/2005 | Wittenburg et al. | ...................... | 455/404.2 |
| 2005/0255861 A1 * | 11/2005 | Wilson et al. | ...................... | 455/456.2 |
| 2006/0155761 A1 * | 7/2006 | Van De Sluis et al. | ...................... | 707/104.1 |
| 2006/0206610 A1 * | 9/2006 | Ling et al. | ...................... | 709/226 |
| 2006/0224625 A1 * | 10/2006 | Warner | ...................... | 707/104.1 |
| 2006/0242681 A1 * | 10/2006 | Brain et al. | ...................... | 725/109 |
| 2006/0244830 A1 * | 11/2006 | Davenport et al. | ...................... | 348/148 |
| 2006/0246918 A1 * | 11/2006 | Fok et al. | ...................... | 455/456.1 |
| 2007/0093955 A1 * | 4/2007 | Hughes | ...................... | 701/200 |

OTHER PUBLICATIONS

"The Key to XP Search Companion—Your Query: Making Search Actually Use Index Server", Site © 2002-2004 by Richard Gamberg—v.Richard, http://xpsearch.info/xps2.htm, 2 pages.*

(Continued)

*Primary Examiner* — James D Nigh
(74) *Attorney, Agent, or Firm* — Schmeiser, Olsen & Watts LLP; John R. Pivnichny

(57) ABSTRACT

A method and apparatus shares image data between devices in which a user can automatically search for desired data using time and geographical position data and then negotiate an exchange for any located data.

27 Claims, 2 Drawing Sheets

(56) References Cited

OTHER PUBLICATIONS

"The Windows Xp Search Companion Finds it Faster", Sep. 3, 2001, Sharon Crawford, Windows XP Expert Zone Community Columnist, http://www.microsoft.com/windowsxp/using/helpandsupport/learnmore/crawford_september03.mspx, 4 pages.*

"Windows XP Technical Overview p. 2 of 11: Intelligent User Interface", May 18, 2001, http://web.archive.org/web/20011220053828/www.microsoft.com/win, 6 pages.* http://www.smartcomputing.com/editorial/article.asp?article=articles/archive/l0906/44l06/44l06.asp., 5 pages.*

"Apple launches the iTunes Store", (http://www.apple.com/pr/library/2003/apr/28musicstore.html, 2 pages, Apr. 2003.*

Search Companion screen shot, 1 page, Dec. 31, 2009.*

"How Gnutella Works", Marshall Brain, 7 pages, http://computer.howstuffworks.com/file-sharing.htm/printable, © 1998-2009 HowStuffWorks, Inc.*

Embedded metadata in pictures: www.halfbakery.com/idea/embedded_20metadata_20in_20pictures, Sep. 7, 2004.

Davis et al., "Mobile Media Metadata for Mobile Imaging", Apr. 13, 2004.

Naaman et al., "Automatically Generating Metadata for Digital Photographs With Geographic Coordinates", May 2004.

* cited by examiner

METHOD OR APPARATUS FOR SHARING IMAGE DATA

CROSS-REFERENCE TO RELATED APPLICATIONS

This application claims priority from GB Application Number 0510713.1 filed May 26, 2005 and entitled A METHOD OR APPARATUS FOR SHARING IMAGE DATA.

FIELD OF THE INVENTION

This invention relates generally to the field of retrieving desired image data from a remote media storage device, and more particularly to retrieving the desired image data using time and geographical location data.

BACKGROUND OF THE INVENTION

Image capture devices in the form of still or video cameras are increasingly common and are often integrated with other devices such as mobile telephones. Nevertheless, it is still a commonplace event for people to be placed in a situation where they would like to take pictures or record video but do not have direct access to a suitable camera. For example, they may have simply forgotten to bring their camera or the camera they have brought may be no use because of a flat battery or lack of film, tape or memory space. Cases may even arise where a person has a working camera but it is inadequate in some way for taking pictures in a given situation. For example, a person may be carrying a mobile telephone which includes a camera but wishes to take pictures of distant wildlife. The low resolution and limited lens performance of some mobile phone cameras would only enable the user to obtain low quality images.

In such situations, there may be a number of other people with suitable working cameras in the vicinity. It may be possible for a first person without a suitable camera to obtain copies of the pictures or video captured by a second person. This may be carried out manually by swapping contact details and agreeing on a later delivery or may be carried out immediately by transmitting image data between the second person's camera and a suitable storage device held by the first person. For example, the camera may be equipped with Bluetooth™ technology and wirelessly transmit the image data to a similarly equipped personal digital assistant (PDA) held by the first person. However, obtaining such copies, even when electronically transferred, involves making contact with one or more of the other people and completing complex arrangements for any agreed delivery of the image data. This may be particularly difficult in busy or short-lived situations or events.

SUMMARY OF THE INVENTION

Briefly stated, a method and apparatus shares image data between devices in which a user can automatically search for desired data using time and geographical position data and then negotiate an exchange for any located data.

Embodiments provide a method for retrieving image data including the steps of: (a) establishing search criteria based on time and geographical location data; (b) identifying a set of connected devices; (c) identifying from the set a device storing image data meeting the search criteria; and (d) requesting a copy of the image data from the identified device.

The image data may include photograph or video. The identified device may include a camera. The set of devices may be connected via a wireless connection technology. The connection may be via a local area network (LAN). The LAN may be a peer to peer network. The connection may be to a wide area network. The method may include requesting the image data to be transmitted to one or more given locations or receiving devices. If the search criteria cannot be met by any of the set of connected devices then the search criteria may be modified and steps (b), (c), and (d) repeated. If the search criteria cannot be met by any of the set of connected devices then the search criteria may be stored to enable steps (b), (c), and (d) to be repeated when further devices become available. After step (a) the search criteria may be stored for later use in steps (b), (c) and (d).

Step (d) may include a negotiation mechanism for obtaining the copy of the data. The negotiation mechanism may include a payment facility. The image data may be in the form of a request for the supply of image data meeting the search criteria. The method may include the further steps of: receiving the request for the supply of image data; obtaining the image data; and supplying the image data to the identified device. A time element may be omitted from the search criteria. Step (c) may include searching one or more logs of captured image data indexed by geographical position. The method may be carried out by a software agent.

The geographical position data may be absolute position data such as GPS or signal triangulation data. The geographical position data may be relative position data such as data identifying one or more devices within a vicinity. The identified device may be a further device, indicated by a connected device as a source of said image data.

Other embodiments provide apparatus for retrieving image data including: a time and geographical locating device for establishing search criteria based on time and geographical location data; a networking module for identifying a set of connected devices; a search engine for identifying from the set a device storing image data meeting the search criteria; and a negotiating mechanism for requesting a copy of the image data from the identified device.

Further embodiments provide apparatus for retrieving image data including: means for establishing search criteria based on time and geographical location data; means for identifying a set of connected devices; means for identifying from the set a device storing image data meeting the search criteria; and means for requesting a copy of the image data from the identified device. Some embodiments provide a device for obtaining copies of image data captured at a given location, the device including: first means for obtaining data representing a location; second means for communicating with other devices holding image data captured at the location; and third means for negotiating receipt from one or more of the other devices of copies of the image data. The second means may be a network and the first and third means may be provided by a mobile software agent operable to move through the network between the other devices.

Other embodiments provide a software program or group of software programs for enabling a programmable electronic device or group of programmable electronic devices to carry out a method for retrieving image data including the steps of: (a) establishing search criteria based on time and geographical location data; (b) identifying a set of connected devices; (c) identifying from the set a device storing image data meeting the search criteria; and (d) requesting a copy of the image data from the identified device.

Some embodiments provide a software program or group of software programs for enabling a programmable electronic device or group of programmable electronic devices to provide apparatus for retrieving image data comprising: time and geographical locating device for establishing search criteria based on time and geographical location data; a networking module for identifying a set of connected devices; a search engine for identifying from the set a device storing image data meeting the search criteria; and a negotiating mechanism for requesting a copy of the image data from the identified device.

Other embodiments provide a software program or group of software programs for enabling a programmable electronic device or group of programmable electronic devices to provide apparatus for retrieving image data comprising: means for establishing search criteria based on time and geographical location data; means for identifying a set of connected devices; means for identifying from the set a device storing image data meeting the search criteria; and means for requesting a copy of the image data from the identified device.

Further embodiments provide a software program or group of software programs for enabling a programmable electronic device or group of programmable electronic devices to provide a device for obtaining copies of image data captured at a given location, the device including: first means for obtaining data representing a location; second means for communicating with other devices holding image data captured at the location; and third means for negotiating receipt from one or more the other devices of copies of the image data.

DETAILED DESCRIPTION OF THE PREFERRED EMBODIMENT

Figure 1:
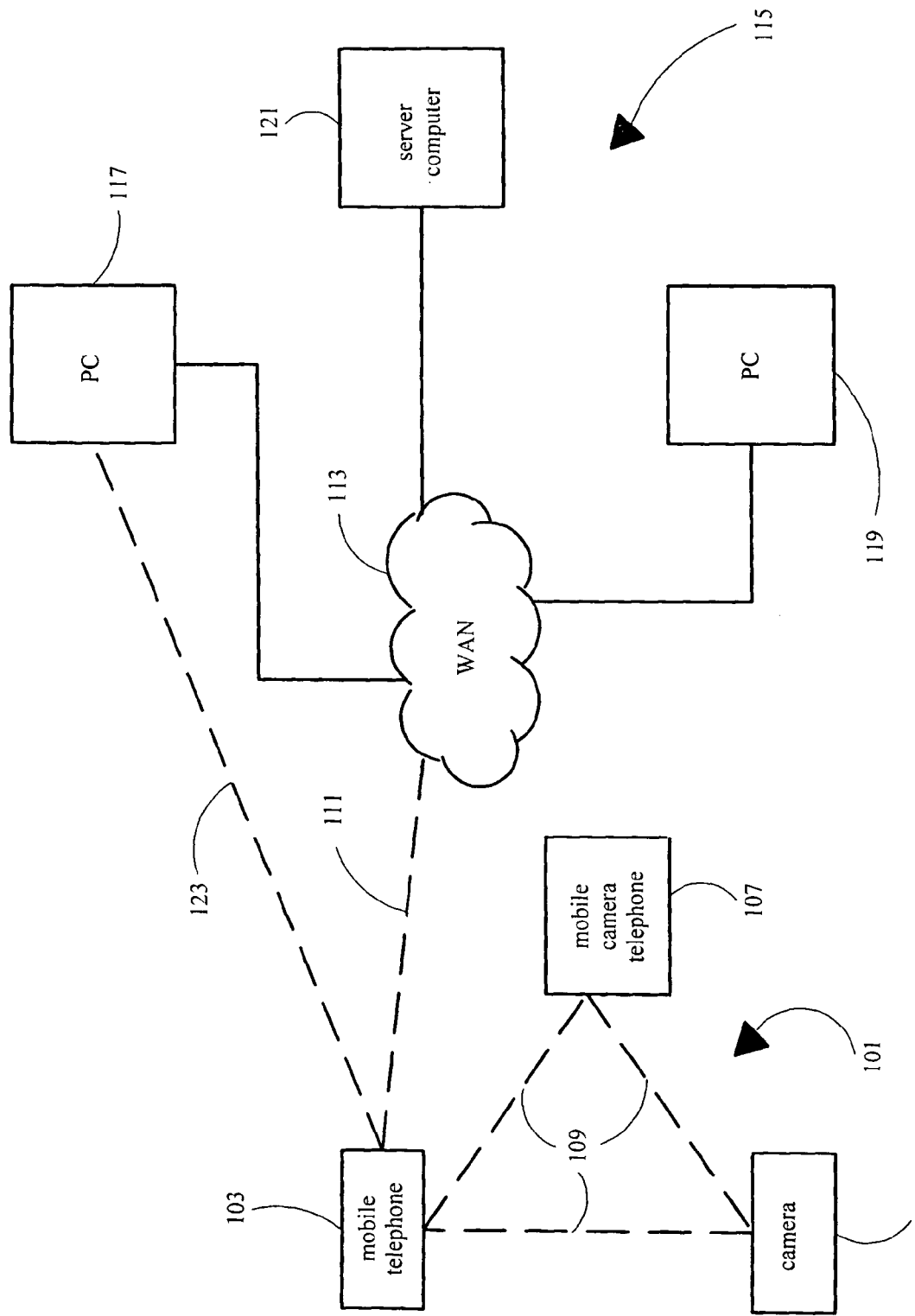
FIG. 1 is a schematic illustration of a computer system and a network of mobile devices.

Referring to FIG. 1, a group 101 of mobile devices comprises a mobile telephone 103, a camera 105 and a mobile camera telephone 107. Each mobile device in the group 101 is equipped with a local wireless networking technology in the form of Bluetooth™ which is used to form a local area network (LAN) 109. The LAN 109 interconnects the group 101 of devices and enables communications between each device. The mobile telephone 103 also has a connection 111 to a wide area network (WAN) 113 in the form of the internet which forms part of a computer system 115. The computer system 115 comprises two personal computers (PCs) 117, 119 and a server computer 121 which are interconnected via the WAN 113. The mobile telephone 103 is also capable of making a further connection 123 via Bluetooth™ to the PC 117.

The LAN 109 preferably enables the group of mobile devices 101 to communicate with each other and to exchange data such as image data and user contact details. Each of the group of mobile devices is preferably also equipped with a global positioning system (GPS) providing GPS data which describes the geographical position for the given device. This GPS data can also preferably be shared between the devices in the group 101. The mobile to WAN connection 111 enables the mobile phone 103 to communicate with the computers 117, 119, 121 and to access data held on them. The mobile to PC connection 123 provides an alternative link between the mobile telephone 103 and the computer system 115 via the PC 117 and also enables the exchange of data between the PC and mobile telephone.

The mobile phone 103 runs software in the form of a mobile software agent which enables the user of the mobile phone to request copies of image data recorded at a particular time and geographical position. The user selects a time and geographical position supplied from the on-board GPS device and the agent uses this data as search criteria to first search local devices via the LAN 109 and then to search more remote devices such as the computers 117, 119 121 via the connection 111 to the WAN 113. As soon as data which meets the search criteria is located this is presented to the user who can then select desired image data for the specified time and location. Once this selection is made the agent returns to the source of the data, obtains a copy of the data and returns it to the mobile telephone. The agent is capable of carrying out negotiations with the source in order to obtain the desired copies of the data. The negotiations may include proving the identity of the requester or the making of a payment. The agent may specify that the copies be sent to an alternative location such as to the PC 117 via e-mail.

The user may instruct the agent to operate in a delayed or partially delayed mode. In the partially delayed mode, the agent only searches local devices via the LAN 109 for the requested data and if the data is not located then the search criteria are stored for later use. In the delayed mode, the agent simply stores the search criteria for later user. The later use in either mode is triggered automatically or manually by the user when the mobile phone comes into contact with the PC 117 via the connection 123. In this situation the agent is able to use the PC to complete its search for the requested data on the computer system via the WAN 113. The delayed modes of operation allow advantage to be taken of the faster connection speeds and greater processing power provided by the computer system 115.

The system allows a user without a camera to automatically make either immediate or delayed contact with other people using cameras and to request copies of any image data they may have for a given location, without disturbance and unobtrusively completing any required negotiations to obtain the image data.

Figure 2:
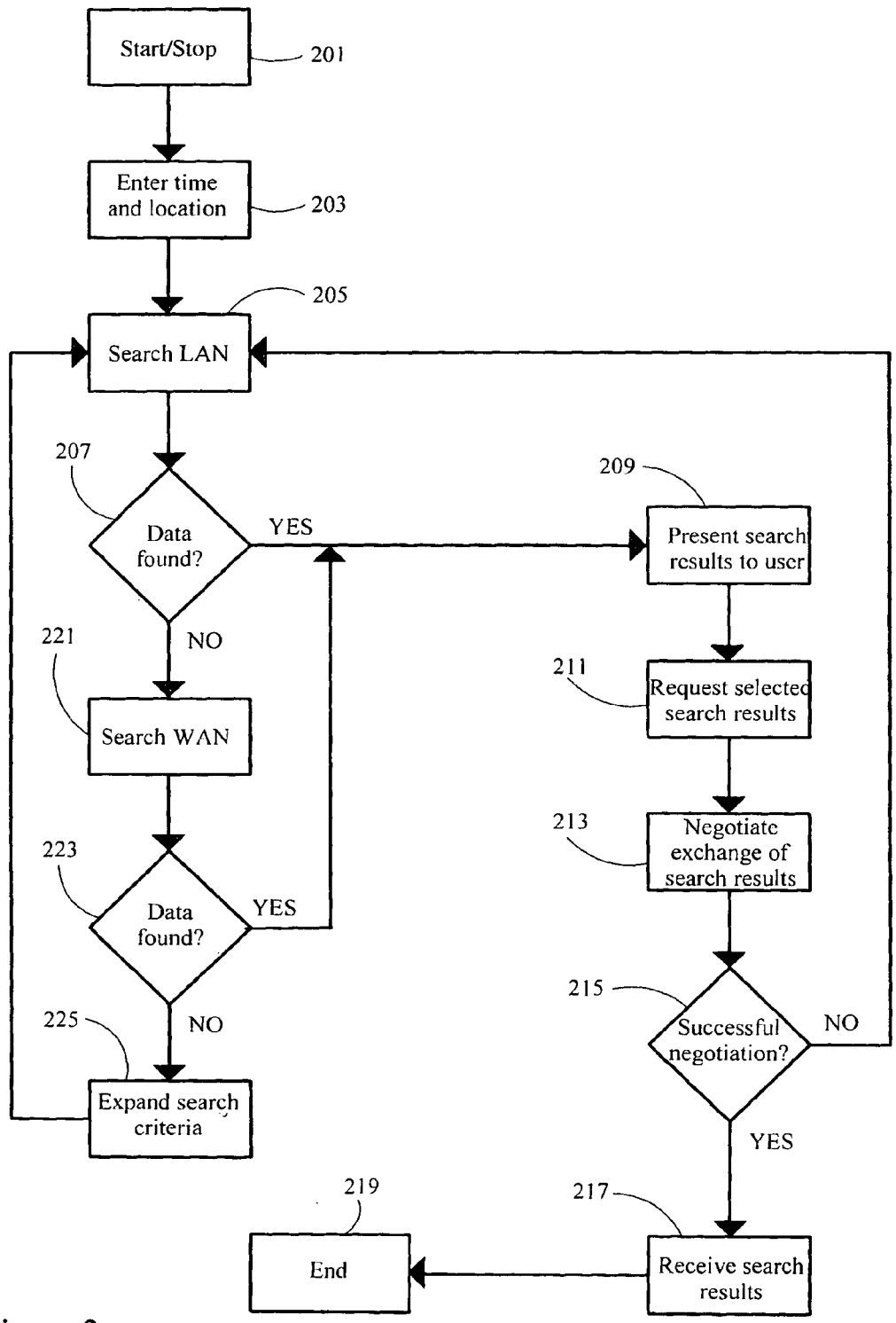
FIG. 2 is a flow chart illustrating the processing carried out in the devices and in the computer system of FIG. 1.

Referring to FIG. 2, the processing carried out by the agent is now described. At step 201, the user initiates the process by requesting image data and processing moves to step 203 where the software agent initializes and queries the user for a time and location. The user has the option to enter a time and location manually or obtain the data for the present time and location from the GPS system. The agent uses the input data at step 205 to search local devices via the LAN 109, searching each connected device in turn for data meeting the search criteria.

If a source of the desired data is found or the search of all devices is completed without finding applicable data then processing moves to step 207. From step 207, processing moves to step 209 only if the search was successful and the results of the search are presented to enable user to select the desired data. Processing then moves to step 211 where the agent requests the selected data from the data source and carries out any required negotiation with the source such as making a payment or verifying the users identity. If at step 215, the negotiation was successful then processing moves to step 217 where the requested data is transmitted to the destination defined by the agent under the control of the user. The destination for the requested data may be set, for example, as the mobile phone 103 or the PC 117 via a suitable transmission medium such as e-mail. From step 217, the processing ends at step 219. If however at step 215, the negotiation fails then processing returns to step 205 where the search is resumed for an alternative source for the required image data.

If at step 207 all the locally connected devices have been searched and no suitable data located, then processing moves to step 221. At step 221 the connection 111 to the WAN 113 is utilized by the agent to search for possible sources of the desired data in the computer system 115. The search ends if either the desired data is located or all possible sources have been unsuccessfully searched. Processing then moves to step 223 where if the desired data has been located, processing moves to step 209 and proceeds as described above. If the data has not been found then processing moves to step 225 where the user is prompted to expand the search criteria. The search criteria can be expanded by broadening either or both of the time and location criteria. Processing then returns to step 205 where the search is resumed as described above but with the expanded criteria.

In the above processing, if the user has specified the delayed option or the agent is unable to locate any device via the LAN 109 then the processing holds at step 203. When the agent detects a suitable device on the LAN 109 or the connection 123 with the PC 117 becomes available, then the agent resumes processing at step 205. Similarly, if the partially delayed option is specified and the desired data has not yet been located, then processing holds at step 221 until the either the connection 123 with the PC 117 or the connection with the WAN 113 becomes available.

In another embodiment, the agent is operable to use the search criteria to locate requests for image data to be captured. The request is then returned to the user's device, the user uses a camera to capture the requested data and the agent then returns the captured image data to the requester.

In further embodiments, the negotiation mechanism used may include payment or other incentives to the user for the provision of the image data. The negotiation mechanism may enable the user to request specific features for the image data such as the use of a wide angle view or for particular objects or landmarks to be included in a captured image.

In some embodiments, the negotiation step may include an agreement to exchange image data. The use of the image data may be specified or restricted. On other embodiments, the image data includes audio data which was captured with the image data or associated with the image data at a later time.

In some embodiments the LAN provides a peer to peer network. In other embodiments one or more of the connected devices do not include all the required functionality to establish geographical position, to capture image data and to communicate with other devices. In this case, the LAN 109 is used to share functionality, such as access to GPS data, across the set of connected devices. For example, a mobile phone may connect to the LAN 109 but not have a GPS facility. In this case the agent is arranged to negotiate access to the required GPS data with a local GPS enabled device which may not be a camera from which the desired image data is eventually obtained.

In further embodiments, the agent is arranged to use on-line logs of image data which are searchable with the time and location search criteria in order to identify the source for the desired data. In some embodiments, the time criterion is omitted from the search criteria for identifying desired image data.

In another embodiment, the processing of FIG. 2 is carried out by a software client on the mobile device which uses a remote search engine to carry out the searching for the desired data. The client may be operable to transfer the search request to a similar client program on an associated computer with which it forms a suitable connection.

In some embodiments, the agent is operable to carry out the search for desired image data by broadcasting a request for the data over a network, and if a response is received from one or more entities, to negotiate with each entity for the exchange of the desired image data. In other embodiments, the agent is operable to store contact details for one or more devices within a given vicinity at a given time and communicate with one or more of those devices at a later time away from the vicinity for the exchange of image data desired by the user. The communication may be either by searching for the devices or broadcasting a request to the devices.

In other embodiments, the geographic position data is obtained via a communications network of a mobile device such as a mobile phone network. The position is absolute and may be determined by the network from GPS data sent from the mobile device or by known triangulation techniques based on the signals between the mobile device and the network's transceivers. In further embodiments, the geographic position data is relative (as opposed to absolute) and is defined by the group of mobile devices which are in communication at any given time. When the user of the mobile device indicates that image data is required for the current location, the mobile device identifies the other devices with which it can communicate. These identified devices can then be queried contemporaneously or at a later time for desired image data. In other words, the geographical position data may be absolute (e.g. GPS data) and locally or remotely determined. Alternatively, the geographical position data may be relative and determined locally.

It will be understood by those skilled in the art that the apparatus that embodies a part or all of the present invention may be a general purpose device having software arranged to provide a part or all of an embodiment of the invention. The device could be single device or a group of devices and the software could be a single program or a set of programs. Furthermore, any or all of the software used to implement the invention can be communicated via any suitable transmission or storage means so that the software can be loaded onto one or more devices.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A method for retrieving image data, said method comprising:
   a mobile device generating a request for image data satisfying search criteria that comprises a specified time and geographical location at which the image data has been recorded, wherein a local area network (LAN) consists of the mobile device and other mobile devices, wherein multiple devices are interconnected via a wide area network (WAN), wherein the multiple devices of the WAN consist of a first computer and other computers, wherein the mobile device is connected to the first computer via the WAN and is directly connected to the first computer via a link outside of the WAN;
   said mobile device searching the other mobile devices of the LAN for the image data that satisfies the search criteria, wherein said searching the other mobile devices of the LAN does not find the image data that satisfies the search criteria;
   responsive to said searching the other mobile devices of the LAN not finding the image data that satisfies the search criteria, said mobile device contacting the first computer via the link to use the first computer to perform searching the multiple devices of the WAN for the image data that satisfies the search criteria, wherein said searching the multiple devices of the WAN comprises finding a source device of the multiple devices of the WAN such that the source device comprises the image data that satisfies the search criteria; and responsive to said finding the source device comprising the image data that satisfies the search criteria, said mobile device triggering a transmission of the image data from the source device to a destination selected from the group consisting of the mobile device and the first computer.

2. The method of claim 1, wherein the destination is the mobile device.

3. The method of claim 1, wherein the destination is the first computer.

4. The method of claim 1, wherein the method further comprises:

after said finding the source device comprising the image data that satisfies the search criteria and before said triggering the transmission of the image data from the source device to the destination, said mobile device negotiating an agreement with the source device, wherein the agreement is for the mobile device to make a payment to the source device for the transmitted image data and for the transmitted image data to include a feature selected from the group consisting of a wide angle view, specified objects, and specified landmarks.

5. The method of claim 4, wherein feature consists of the wide angle view.

6. The method of claim 4, wherein feature consists of the specified objects.

7. The method of claim 4, wherein feature consists of the specified landmarks.

8. The method of claim 1, wherein the mobile device is a mobile telephone, and wherein the other mobile devices of the LAN consist of a camera and a mobile camera telephone.

9. The method of claim 1, wherein the first computer is a first personal computer (PC), and wherein the other computers of the WAN consist of a second PC and a server computer.

10. A mobile device comprising a storage medium readable by the mobile device, said storage medium storing executable instructions which upon being executed by the mobile device causes the mobile device to implement a method for retrieving image data, said method comprising:

generating a request for image data satisfying search criteria that comprises a specified time and geographical location at which the image data has been recorded, wherein a local area network (LAN) consists of the mobile device and other mobile devices, wherein multiple devices are interconnected via a wide area network (WAN), wherein the multiple devices of the WAN consist of a first computer and other computers, wherein the mobile device is connected to the first computer via the WAN and is directly connected to the first computer via a link outside of the WAN;

searching the other mobile devices of the LAN for the image data that satisfies the search criteria, wherein said searching the other mobile devices of the LAN does not find the image data that satisfies the search criteria;

responsive to said searching the other mobile devices of the LAN not finding the image data that satisfies the search criteria, contacting the first computer via the link to use the first computer to perform searching the multiple devices of the WAN for the image data that satisfies the search criteria, wherein said searching the multiple devices of the WAN comprises finding a source device of the multiple devices of the WAN such that the source device comprises the image data that satisfies the search criteria; and responsive to said finding the source device comprising the image data that satisfies the search criteria, triggering a transmission of the image data from the source device to a destination selected from the group consisting of the mobile device and the first computer.

11. The mobile device of claim 10, wherein the destination is the mobile device.

12. The mobile device of claim 10, wherein the destination is the first computer.

13. The mobile device of claim 10, wherein the method further comprises:

after said finding the source device comprising the image data that satisfies the search criteria and before said triggering the transmission of the image data from the source device to the destination, negotiating an agreement with the source device, wherein the agreement is for the mobile device to make a payment to the source device for the transmitted image data and for the transmitted image data to include a feature selected from the group consisting of a wide angle view, specified objects, and specified landmarks.

14. The mobile device of claim 13, wherein feature consists of the wide angle view.

15. The mobile device of claim 13, wherein feature consists of the specified objects.

16. The mobile device of claim 13, wherein feature consists of the specified landmarks.

17. The mobile device of claim 10, wherein the mobile device is a mobile telephone, and wherein the other mobile devices of the LAN consist of a camera and a mobile camera telephone.

18. The mobile device of claim 10, wherein the first computer is a first personal computer (PC), and wherein the other computers of the WAN consist of a second PC and a server computer.

19. A system comprising a local area network (LAN) and a wide area network (WAN), wherein the LAN consists of a mobile device and other mobile devices, wherein multiple devices are interconnected via the WAN, wherein the multiple devices of the WAN consist of a first computer and other computers, wherein the mobile device is connected to the first computer via the WAN and is directly connected to the first computer via a link outside of the WAN;

said mobile device configured to generate a request for image data satisfying search criteria that comprises a specified time and geographical location at which the image data has been recorded;

said mobile device configured to search the other mobile devices of the LAN for the image data that satisfies the search criteria;

responsive to a search of the other mobile devices of the LAN not finding the image data that satisfies the search criteria, said mobile device is configured to contact the first computer via the link to use the first computer to perform searching the multiple devices of the WAN for the image data that satisfies the search criteria, wherein a search of the multiple devices of the WAN is configured to find a source device of the multiple devices of the WAN such that the source device comprises the image data that satisfies the search criteria; and responsive to a finding of the source device comprising the image data that satisfies the search criteria, said mobile device is configured to trigger a transmission of the image data from the source device to a destination selected from the group consisting of the mobile device and the first computer.

20. The system of claim 19, wherein the destination is the mobile device.

21. The system of claim 19, wherein the destination is the first computer.

22. The system of claim 19,
wherein after said finding of the source device comprising the image data that satisfies the search criteria and before a triggering of the transmission of the image data from the source device to the destination, said mobile device is configured to negotiate an agreement with the source device, wherein the agreement is for the mobile device to make a payment to the source device for the transmitted image data and for the transmitted image data to include a feature selected from the group consisting of a wide angle view, specified objects, and specified landmarks.

23. The system of claim 22, wherein feature consists of the wide angle view.

24. The system of claim 22, wherein feature consists of the specified objects.

25. The system of claim 22, wherein feature consists of the specified landmarks.

26. The system of claim 19, wherein the mobile device is a mobile telephone, and wherein the other mobile devices of the LAN consist of a camera and a mobile camera telephone.

27. The system of claim 19, wherein the first computer is a first personal computer (PC), and wherein the other computers of the WAN consist of a second PC and a server computer.

* * * * *